(12) United States Patent
Hou et al.

(10) Patent No.: US 11,611,143 B2
(45) Date of Patent: Mar. 21, 2023

(54) BASE STATION ANTENNA WITH HIGH PERFORMANCE ACTIVE ANTENNA SYSTEM (AAS) INTEGRATED THEREIN

(71) Applicant: CommScope Technologies LLC, Hickory, NC (US)

(72) Inventors: XiaoHua Hou, Richardson, TX (US); Peter J. Bisiules, LaGrange Park, IL (US); Sammit Patel, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 141 days.

(21) Appl. No.: 17/203,090

(22) Filed: Mar. 16, 2021

(65) Prior Publication Data

US 2021/0305683 A1  Sep. 30, 2021

Related U.S. Application Data

(60) Provisional application No. 62/993,925, filed on Mar. 24, 2020.

(51) Int. Cl.
*H01Q 5/48* (2015.01)
*H01Q 1/24* (2006.01)
*H01Q 1/42* (2006.01)
*H01Q 21/00* (2006.01)
*H01Q 21/26* (2006.01)

(52) U.S. Cl.
CPC ............. *H01Q 1/246* (2013.01); *H01Q 1/42* (2013.01); *H01Q 5/48* (2015.01); *H01Q 21/0025* (2013.01); *H01Q 21/26* (2013.01)

(58) Field of Classification Search
CPC ..... H01Q 1/246; H01Q 21/0025; H01Q 21/26
See application file for complete search history.

(56) References Cited

U.S. PATENT DOCUMENTS

| 7,907,096 | B2 | 3/2011 | Timofeev et al. |
| 2004/0169612 | A1 | 9/2004 | Song et al. |

(Continued)

FOREIGN PATENT DOCUMENTS

| CN | 100492763 C | 5/2009 |
| CN | 201528038 U | 7/2010 |

(Continued)

OTHER PUBLICATIONS

Shepard et al. "Argos: Practical Many-Antenna Base Stations" Proceedings of the 18th Annual International Conference on Mobile Computing and Networking (12 pages) (Aug. 26, 2012).

(Continued)

*Primary Examiner* — Daniel Munoz
(74) *Attorney, Agent, or Firm* — Myers Bigel, P.A.

(57) ABSTRACT

A base station antenna includes a first antenna having first and second spaced-apart columns of first radiating elements therein, which are configured to operate within a first frequency band. An active antenna system (AAS) is provided, which is configured to operate within a second, typically higher, frequency band. The AAS includes a second antenna within a space between the first and second columns of first radiating elements. These first radiating elements may include tilted feed stalks which support higher integration by enabling the first radiating elements to overhang at least a portion of the second antenna.

19 Claims, 16 Drawing Sheets

(56) References Cited

U.S. PATENT DOCUMENTS

| | | |
|---|---|---|
| 2004/0259597 A1 | 12/2004 | Gothard et al. |
| 2005/0264463 A1 | 12/2005 | Gottl et al. |
| 2006/0273865 A1 | 12/2006 | Timofeev et al. |
| 2007/0229385 A1 | 10/2007 | Deng et al. |
| 2009/0135076 A1 | 5/2009 | Foo |
| 2009/0224994 A1 | 9/2009 | Le et al. |
| 2012/0087284 A1 | 4/2012 | Linehan et al. |
| 2012/0280874 A1 | 11/2012 | Kim et al. |
| 2013/0234883 A1* | 9/2013 | Ma .............. G01S 7/2813 342/174 |
| 2014/0313095 A1* | 10/2014 | Pu .............. H01Q 1/246 343/836 |
| 2015/0084823 A1 | 3/2015 | Wang et al. |
| 2015/0097739 A1 | 4/2015 | Samuel |
| 2017/0040679 A1 | 2/2017 | Fröhler et al. |
| 2018/0323513 A1 | 11/2018 | Varnoosfaderani et al. |
| 2019/0123426 A1 | 4/2019 | Bryce |
| 2019/0173162 A1* | 6/2019 | Farzaneh .............. H01Q 21/062 |
| 2019/0181557 A1 | 6/2019 | Isik et al. |
| 2019/0267701 A1 | 8/2019 | Kim et al. |
| 2019/0312338 A1 | 10/2019 | Guntupalli et al. |
| 2019/0312394 A1 | 10/2019 | Paynter et al. |
| 2020/0076079 A1 | 3/2020 | Shan et al. |
| 2020/0288495 A1 | 9/2020 | Gao et al. |
| 2021/0305717 A1 | 9/2021 | Hou et al. |

FOREIGN PATENT DOCUMENTS

| | | |
|---|---|---|
| CN | 101950846 A | 1/2011 |
| CN | 201893434 U | 7/2011 |
| CN | 102800956 A | 11/2012 |
| CN | 103490175 A | 1/2014 |
| CN | 103715521 A | 4/2014 |
| CN | 104319486 A | 1/2015 |
| CN | 206225553 U | 6/2017 |
| CN | 109219905 A | 1/2019 |
| CN | 110323564 A | 10/2019 |
| CN | 114094347 A | 2/2022 |
| EP | 1204161 A1 | 5/2002 |
| EP | 2784876 A1 | 10/2014 |
| EP | 2827449 A2 | 1/2015 |
| EP | 3544204 A2 | 9/2019 |
| EP | 3751665 A1 | 12/2020 |
| WO | 9700586 A1 | 1/1997 |
| WO | 2009061966 A1 | 5/2009 |
| WO | 2019100325 A1 | 5/2019 |
| WO | 2019154362 A1 | 8/2019 |
| WO | 2019236203 A2 | 12/2019 |
| WO | 2020010039 A1 | 1/2020 |
| WO | 2020072880 A1 | 4/2020 |

OTHER PUBLICATIONS

"Communication with European Search Report", EP Application No. 21164674.0, dated Aug. 16, 2021, 12 pp.

He, Yejun, et al., "Novel Dual-Band, Dual-Polarized, Miniaturized and Low-Profile Base Station Antenna", IEEE Transactions on Antennas and Propagation, vol. 63, No. 12, Dec. 2015, pp. 5399-5408.

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

* cited by examiner

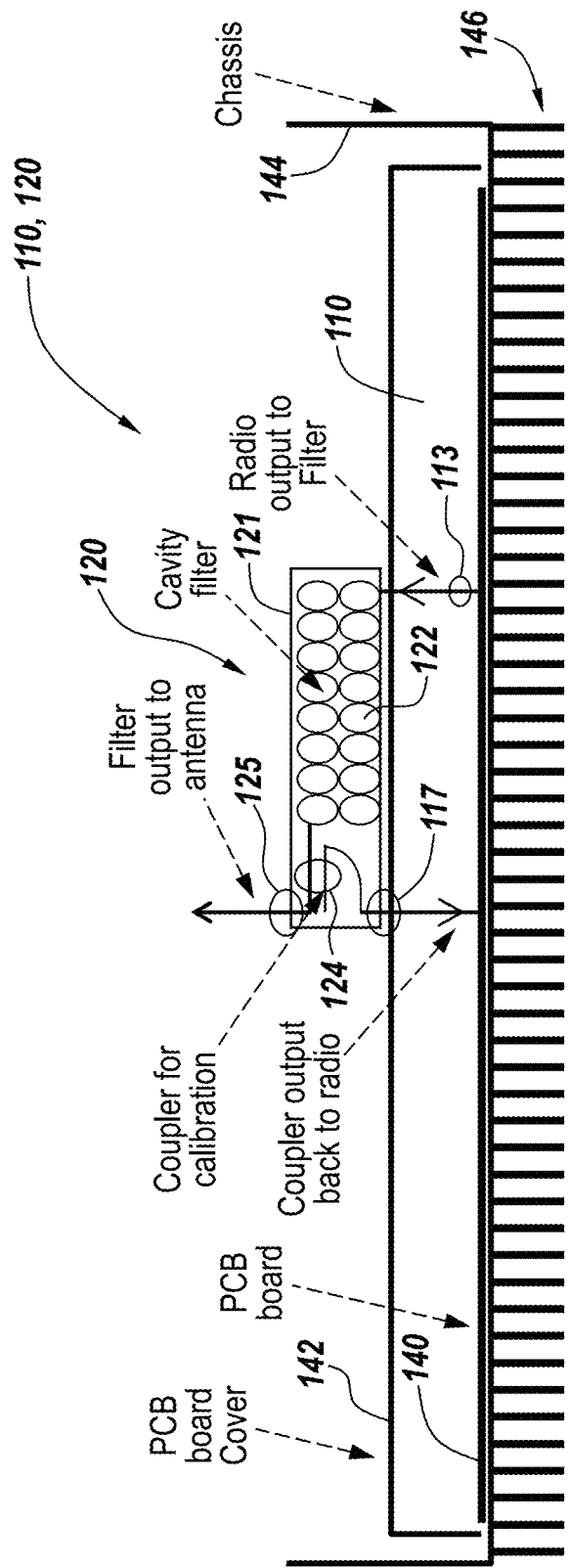

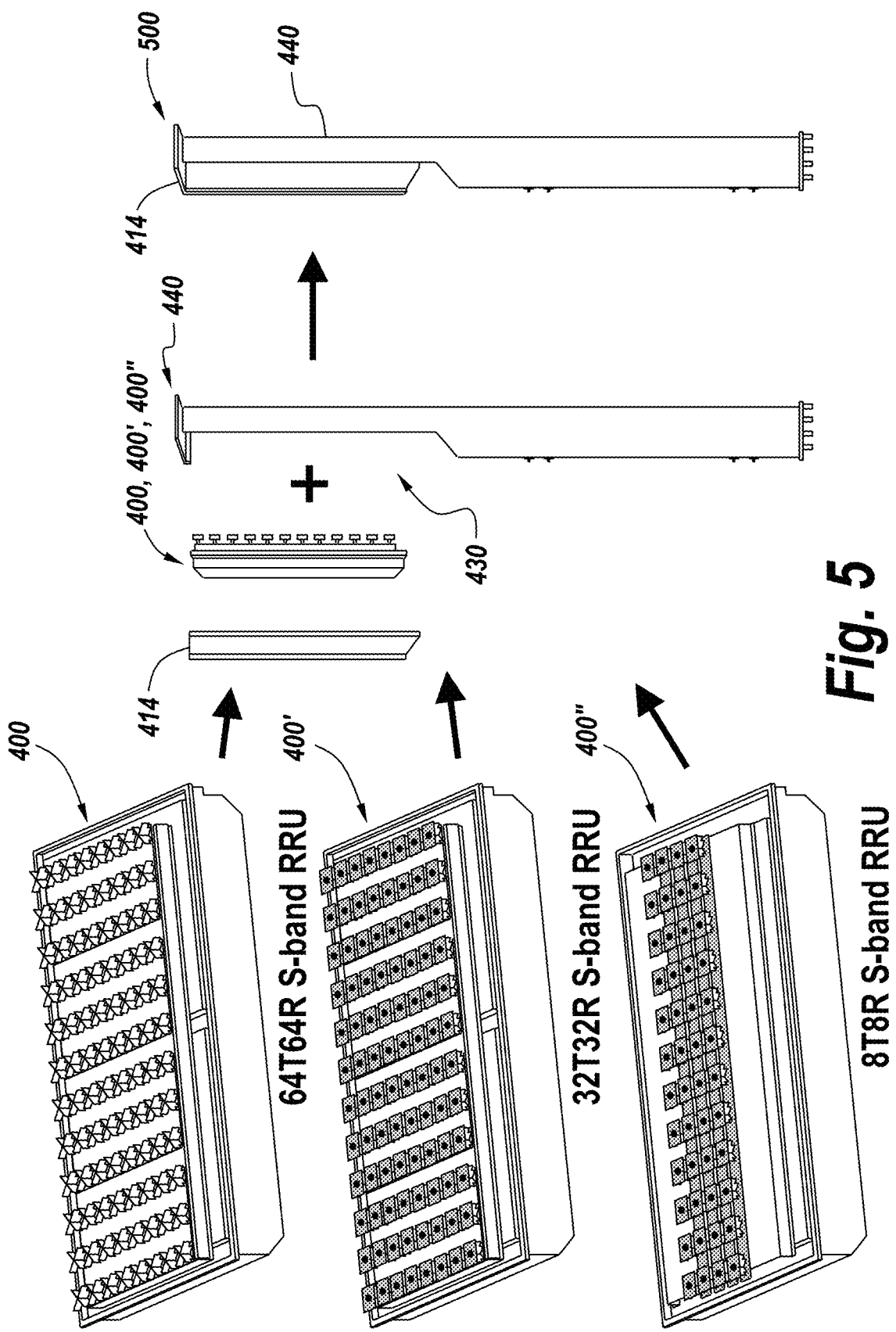

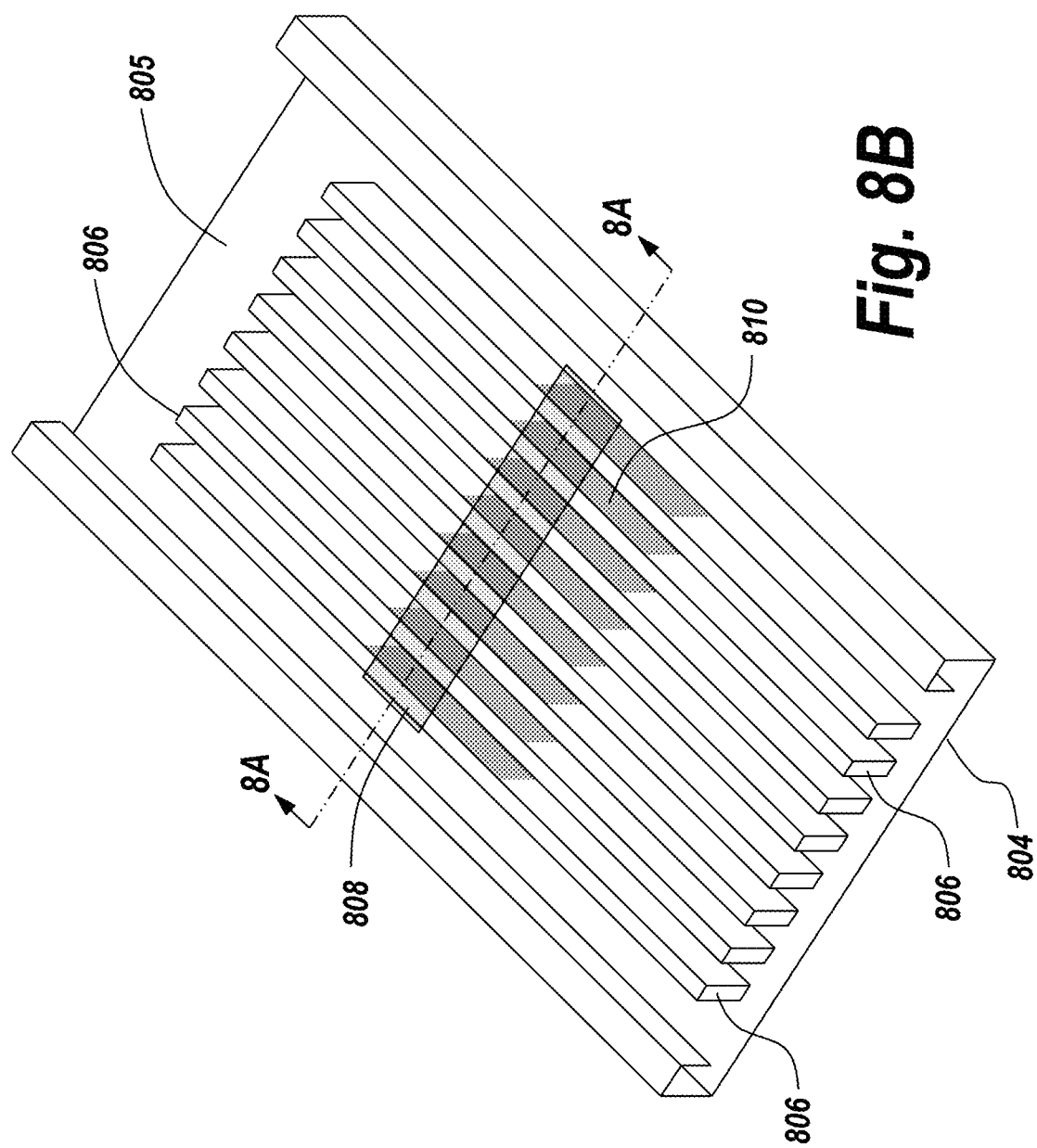

BASE STATION ANTENNA WITH HIGH PERFORMANCE ACTIVE ANTENNA SYSTEM (AAS) INTEGRATED THEREIN

REFERENCE TO PRIORITY APPLICATION

This application claims priority to U.S. Provisional Application Ser. No. 62/993,925, filed Mar. 24, 2020, the disclosure of which is hereby incorporated herein by reference.

FIELD OF THE INVENTION

The present invention relates to radio communication systems and, more particularly, to multi-beam base station antennas (BSAs) utilized in cellular and other communication systems.

BACKGROUND

Cellular communications systems are well known in the art. In a cellular communications system, a geographic area is divided into a plurality of regions that are referred to as "cells", which are served by respective base stations. A base station may include one or more antennas that are configured to provide two-way radio frequency ("RF") communications with mobile subscribers that are within the cell served by the base station. In many cases, each cell is divided into "sectors." Typically, the base station antennas are mounted on a tower or other raised structure, and the radiation patterns (also referred to herein as "antenna beams") generated by the base station antennas are directed outwardly from the tower.

A common base station configuration is a three-sector configuration in which the cell is divided into three 120° sectors in the azimuth plane to thereby provide 360° coverage. A base station antenna is provided for each sector. In a three sector configuration, the antenna beams generated by each base station antenna typically have a Half Power Beamwidth ("HPBW") in the azimuth (horizontal) plane of about 65° so that the antenna beams provide good coverage throughout a 120° sector. Typically, each base station antenna will include one or more vertically-extending columns of radiating elements that are typically referred to as "linear arrays." Each radiating element may have a HPBW of approximately 65°. By providing a column of radiating elements extending along the elevation (vertical) plane, the elevation HPBW of the antenna beam may be narrowed to be significantly less than 65°, with the amount of narrowing typically increasing with the length of the column in the vertical direction. The radiating elements in a linear array are often spaced apart from adjacent radiating elements by a fixed distance that varies based on the operating frequency band of the radiating elements and performance requirements for the array. The number of radiating elements included in the linear array may then be selected so that the linear array will have a length that provides a desired elevation beamwidth.

The desired elevation beamwidth for a linear array of radiating elements will depend upon the size and geography of the cell in which the base station antenna is deployed. In order to meet cellular operator requirements, base station antenna manufacturers typically sell multiple versions of many base station antenna models that have different array lengths and hence different elevation beamwidths. For example, in some cases, it may be desirable to have a small elevation beamwidth (e.g., 10-15 degrees) in order to increase the antenna gain and/or to reduce spillover of the antenna beam into adjacent cells (as such spillover appears as interference in the adjacent cells). This requires relatively long linear arrays. In other cases, larger elevation beamwidths are acceptable, allowing the use of shorter linear arrays that have fewer radiating elements.

In order to accommodate the increasing volume of cellular communications, new frequency bands are being made available for cellular service. Cellular operators now typically deploy multi-band base station antennas that include arrays of radiating elements that operate in different frequency bands to support service in these new frequency bands. For example, most base station antennas now include both "low-band" linear arrays of radiating elements that provide service in some or all of the 617-960 MHz frequency band and "mid-band" linear arrays of radiating elements that provide service in some or all of the 1427-2690 MHz frequency band. There is also interest in deploying base station antennas that include one or more arrays of "high-band" radiating elements that operate in higher frequency bands, such as some or all of the 3.3-4.2 GHz and/or the 5.1-5.8 GHz frequency bands. The high-band arrays are often implemented as multi-column arrays of radiating elements that can be configured to perform active beamforming where the shape of the antenna beam generated by the array can be controlled to form higher directivity antenna beams that support higher throughput. When beamforming arrays are used, a beamforming radio is often mounted directly on the back of the base station antenna in order to reduce RF losses.

For example, as illustrated by FIG. 1A, a conventional base station antenna unit 10 can include a first base station antenna 12 and a second base station antenna 14, which may be mounted using adjustable mounting brackets 16a-16c to a vertically-extending structure, such as a pole 18 or tower, so that the two antennas 12, 14 are closely aligned in a vertically stacked arrangement. As shown, the first and second base station antennas 12, 14 include respective housings, which are defined in part by respective first and second radomes 22, 24. As will be understood by those skilled in the art, the first radome 22 may have a tube or similar shape that extends around an entire circumference of the first base station antenna 12. Similarly, the second radome 24 may have a tube or similar shape that extends mostly around a circumference of the second base station antenna 14, but includes a rear-side opening therein. This opening facilitates the attachment of a radio 20 to a rear surface of an antenna array (not shown) within the second base station antenna 14. In some cases, this radio may function as a beamforming radio 20. As shown by FIG. 1B, the radio 20 may include: a conventional transmitter/receiver circuit 32 with bidirectional signal processing and calibration control, a filter array 34 with in-line bandpass filters 34a, and a calibration board 36 with in-line couplers 36a and calibration signal feedback to a calibration circuit within the transmitter/receiver circuit 32. As is further shown in FIG. 1A, the calibration board connects to an array of radiating elements 38a of a base station antenna.

Because the requirements for the beamforming antennas are more likely subject to change, and because beamforming antennas may experience higher failure rates, cellular operators may sometimes prefer that the beamforming antennas be implemented as separate antennas. But, there are often disadvantages associated with deploying additional base station antennas. First, a separate charge typically applies for each base station antenna mounted on an antenna tower, and hence increasing the number of antennas typically results in increased installation costs. Second, cellular operators often lease space on antenna towers, and there is typically a separate leasing charge for each item of equipment mounted on the antenna tower. Third, local ordinances and/or zoning regulations may limit the number of base station antennas that can be mounted on an antenna tower, and hence additional antenna towers may need to be erected if the number of base station antennas required exceeds the number permitted by the local zoning ordinances.

When shorter base station antennas are used, it may be possible to mount two base station antennas in a vertically stacked fashion so that the two base station antennas may appear as a single antenna. For example, as disclosed in U.S. Patent Publication No. 2019/0123426, which is hereby incorporated herein by reference, first and second base station antennas may be mounted together in a vertically stacked arrangement so that the composite base station antenna unit has the appearance of a single base station antenna. The first base station antenna may comprise, for example, a conventional dual-band base station antenna that includes low-band and mid-band arrays of radiating elements, and may have a height (i.e., the length of the antenna in the vertical direction that is perpendicular to the plane defined by the horizon when the antenna is mounted for use) in a range from about 1.0 meters to about 2.0 meters. The second base station antenna may comprise, for example, a beamforming antenna that operates in, for example, a portion of the 3.3-4.2 GHz or 5.1-5.8 GHz frequency bands. The height of the second base station antenna may be less than about 1.0 meters, for example.

SUMMARY

A radio unit for a base station antenna may include a filter unit having a plurality of filters and a plurality of calibration couplers therein, with the plurality of calibration couplers having respective inputs electrically coupled to corresponding outputs of the plurality of filters. A radio is also provided, which has a plurality of outputs electrically coupled to a corresponding plurality of input terminals of the plurality of filters. This radio includes a calibration circuit responsive to calibration feedback signals generated at a plurality of outputs of the plurality of calibration couplers.

A radio unit for a base station antenna according to another embodiment of the invention includes a reflector having an array of radiating elements on a front facing surface thereof, and a filter unit having a plurality of filters and a plurality of calibration couplers therein, which extend adjacent a rear facing surface of the reflector. A radio is provided, which has a plurality of outputs electrically coupled to a corresponding plurality of input terminals of the plurality of filters.

A base station antenna according to another embodiment of the invention includes a first antenna having first and second spaced-apart columns of first radiating elements therein, which are configured to operate within a first frequency band. An active antenna system (AAS) is provided, which is configured to operate within a second frequency band. The AAS includes a second antenna extending at least partially into a space between the first and second columns of first radiating elements. This second antenna includes a reflector having a two-dimensional array of second radiating elements thereon, which are arranged into a plurality of rows and a plurality of columns of the second radiating elements.

A base station antenna according to another embodiment of the invention includes a first antenna having first radiating elements therein and a first radome covering the first radiating elements. An active antenna system (AAS) is also provided, which includes a second antenna that extends at least partially into a rear-facing opening in the first antenna. The second antenna includes a reflector having a plurality of feed boards on a front facing surface thereof and a two-dimensional array of second radiating elements on the plurality of feed boards.

According to another embodiment of the invention, a base station antenna is provided, which includes a column of radiating elements supported by at least one feed board. This at least one feed board includes: a first 1-to-N phase shifter thereon having N outputs electrically coupled to a corresponding N pairs of the radiating elements at a first end of the column, and a second 1-to-N phase shifter thereon having N outputs electrically coupled to a corresponding N pairs of the radiating elements at a second end of the column, where N is a positive integer greater than one.

According to a further embodiment of the invention, a radio unit for a base station antenna includes a filter unit containing: (i) a housing having a plurality of filters and a plurality of calibration couplers therein, (ii) a plurality of radio frequency (RF) signal ports electrically coupled to corresponding outputs of the plurality of filters, and (iii) at least one radio feedback port electrically coupled to corresponding outputs of the plurality of calibration couplers. A reflector is also provided, which has at least one printed circuit feed board thereon. This feed board includes RF feed terminals responsive to signals generated at the plurality of RF signal ports. A plurality of radiating elements are provided on the at least one printed circuit feed board.

According to another embodiment, a base station antenna is provided with a first antenna (having first radiating elements therein that are configured to operate within a first frequency band), and an active antenna system (AAS). This AAS is configured to operate within a second frequency band higher than the first frequency band. The AAS includes a filter unit, and this filter unit includes: (i) a housing having a plurality of filters and a plurality of calibration couplers therein, (ii) a plurality of radio frequency (RF) signal ports electrically coupled to corresponding outputs of the plurality of filters, and (ii) at least one radio feedback port electrically coupled to corresponding outputs of the plurality of calibration couplers. A reflector is provided, which has at least one printed circuit feed board thereon. This feed board includes RF feed terminals responsive to signals generated at the plurality of RF signal ports. A plurality of second radiating elements are provided on the at least one printed circuit feed board.

A base station antenna according to another embodiment of the invention includes a reflector having a plurality of columns of radiating elements on a front-facing surface thereof, and an at least single channel phase shifter, which extends at least a majority of the length of the plurality of columns of radiating elements and on a rear-facing surface of the reflector.

BRIEF DESCRIPTION OF THE DRAWINGS

FIG. 2B is a side schematic of a portion of the AAS of FIG. 2A, according to an embodiment of the invention.

FIG. 5 is an exploded side view of a base station antenna (BSA) with an active antenna system (AAS) according to an embodiment of the invention.

FIGS. 8A-8B are end and rear-side perspective views of a base station antenna (BSA) with elongate, dual-channel, phase shifters, according to an embodiment of the invention.

DETAILED DESCRIPTION

Figure 1A:
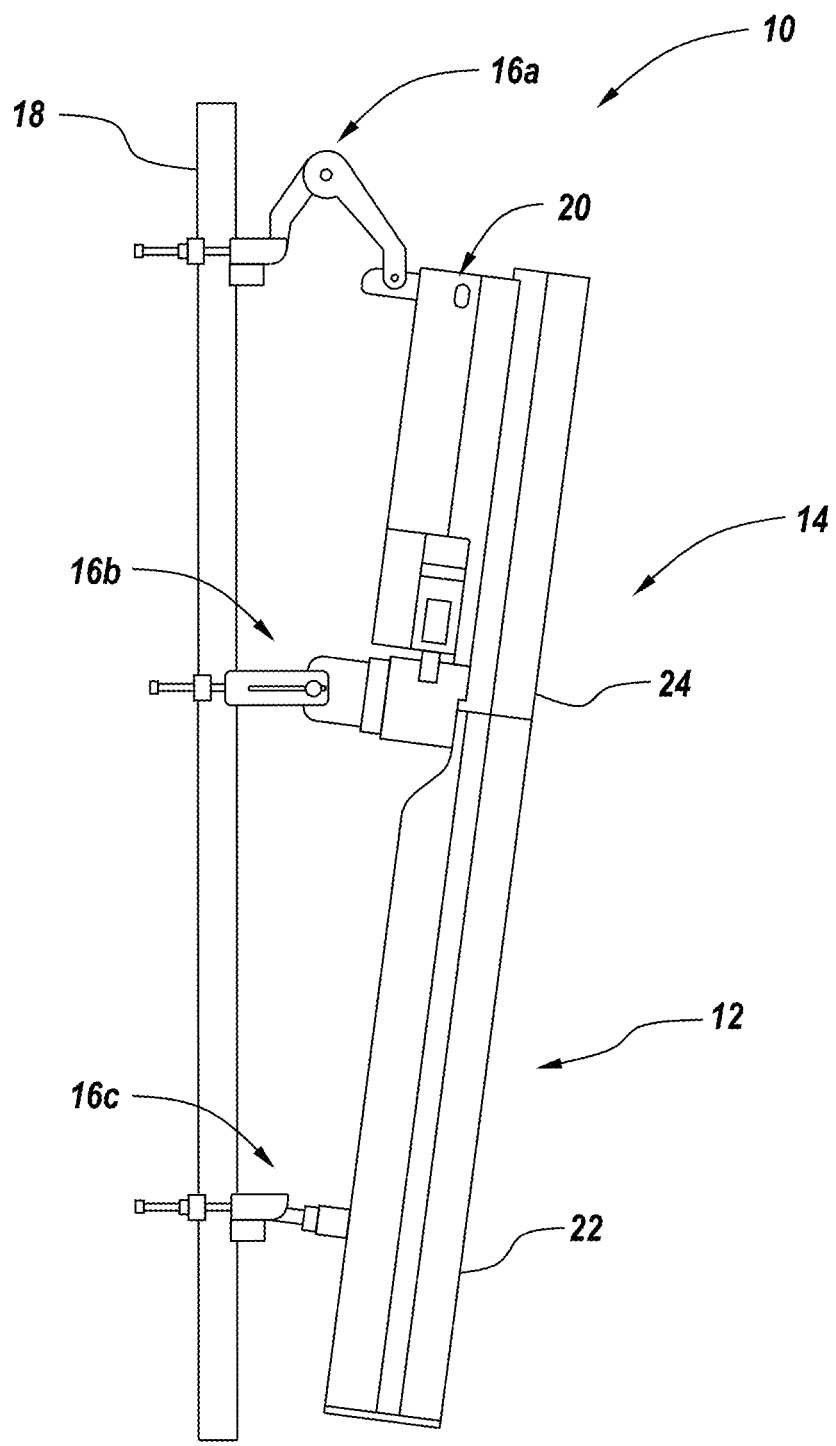
FIG. 1A is a side perspective view of a pole-mounted base station antenna (BSA) with attached rear-side radio, according to the prior art.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
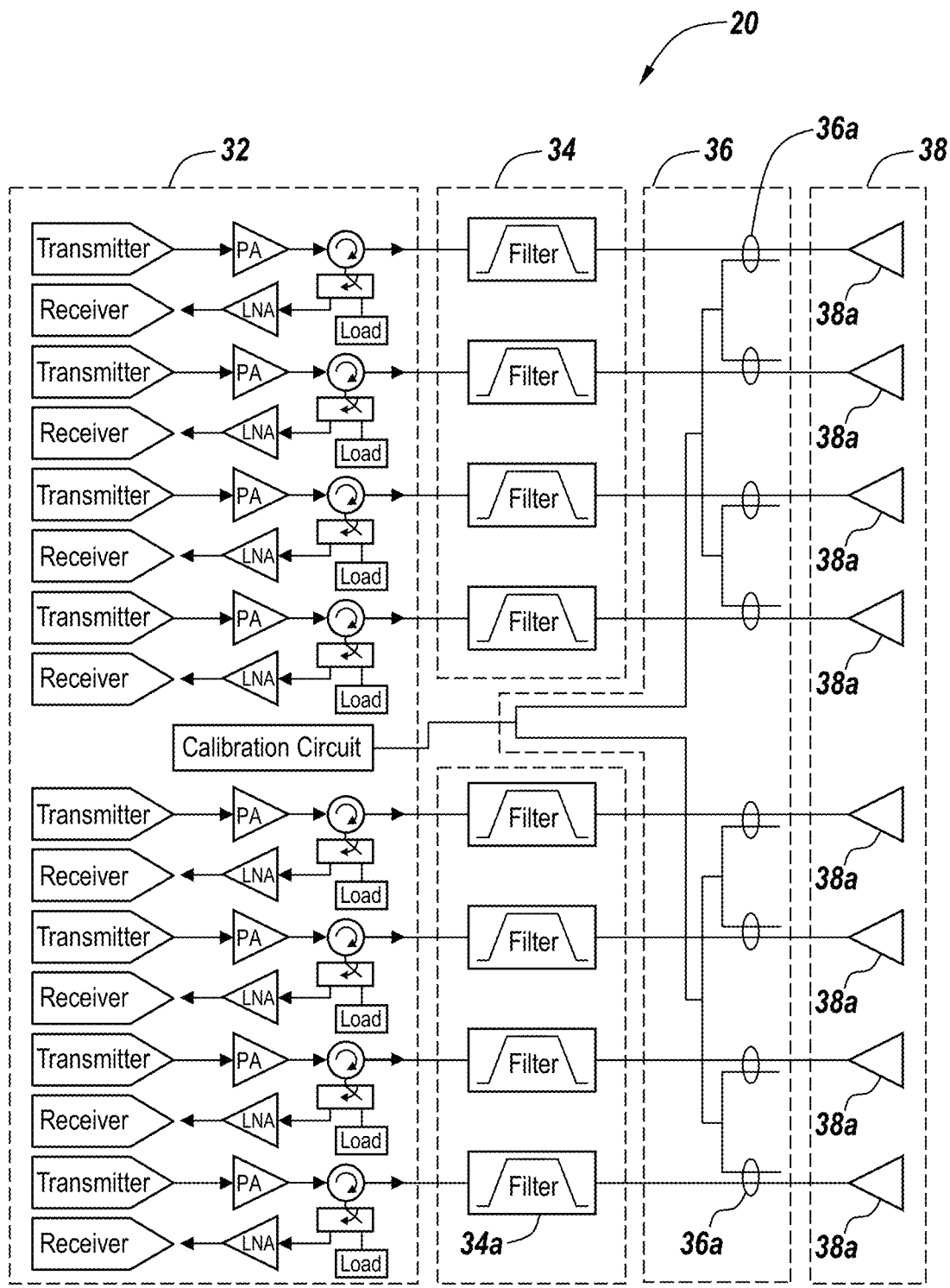
FIG. 1B is an electrical schematic of a conventional radio unit, which may be used in the BSA of FIG. 1A.
Figure 1C:
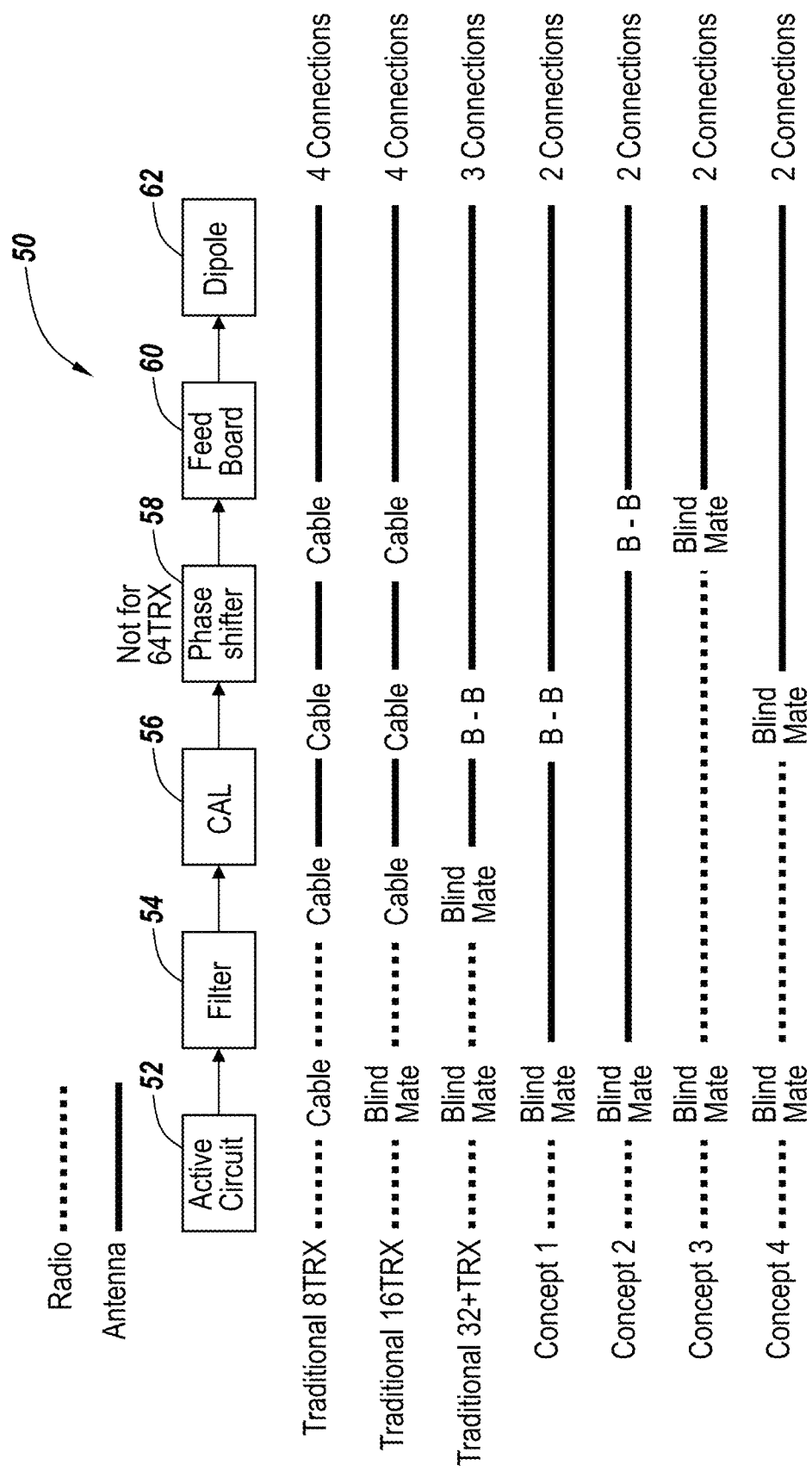
FIG. 1C is a schematic diagram that illustrates a partitioning of modules within a base station antenna system, along with a plurality of alternative cabling and interconnect examples.

Referring now to FIG. 1C, a cascaded partitioning of modules 50 within a base station antenna system is illustrated as including, within a radio frequency (RF) transmission (Tx) path: (i) an active radio circuit 52, (ii) a filter network 54, (iii) calibration logic 56, (iv) a phase shifter network 58, (v) a feed board signal routing network 60, and (vi) a dipole radiating array 62. As shown, in a conventional 8 TRX antenna embodiment, the module partition may include four (4) cable interconnect (e.g., coaxial cable) locations, including two locations associated with an RF radio and two locations associated with a conventional antenna configuration. In a conventional 16 TRX antenna embodiment, blind mate and cable interconnects are provided with the RF radio and two sets of cable interconnects are provided with the antenna. And, in a conventional 32 TRX+ antenna embodiment (i.e., 32 TRX or larger), two sets of blind mate interconnects are provided with the RF radio and one set of board-to-board (B-B) interconnects are provided with the antenna.

In addition, and as described more fully hereinbelow with respect to FIGS. 2-9, in an active antenna system (AAS) according to a first embodiment, one set of blind mate interconnects are provided between the active radio circuit 52 and the filter network 54, and one set of board-to-board (B-B) interconnects are provided between the calibration logic 56 and the phase shifter network 58. In an active antenna system (AAS) according to a second embodiment, one set of blind mate interconnects are provided between the active radio circuit 52 and the filter network 54, and one set of board-to-board (B-B) interconnects are provided between the phase shifter network 58 and the feed board signal routing network 60.

In an active antenna system (AAS) according to a third embodiment, one set of blind mate interconnects are provided between the active radio circuit 52 and the filter network 54, and one set of blind mate interconnects are provided between the phase shifter network 58 and the feed board signal routing network 60. This third configuration enables the radio function to extend to and include the phase shifter network 58. And, in an active antenna system (AAS) according to a fourth embodiment, one set of blind mate interconnects are provided between the active radio circuit 52 and the filter network 54, and one set of board-to-board (B-B) interconnects are provided between the calibration logic 56 and the phase shifter network 58. This fourth configuration enables the radio function to extend to and include the calibration logic 56.

Figure 2A:
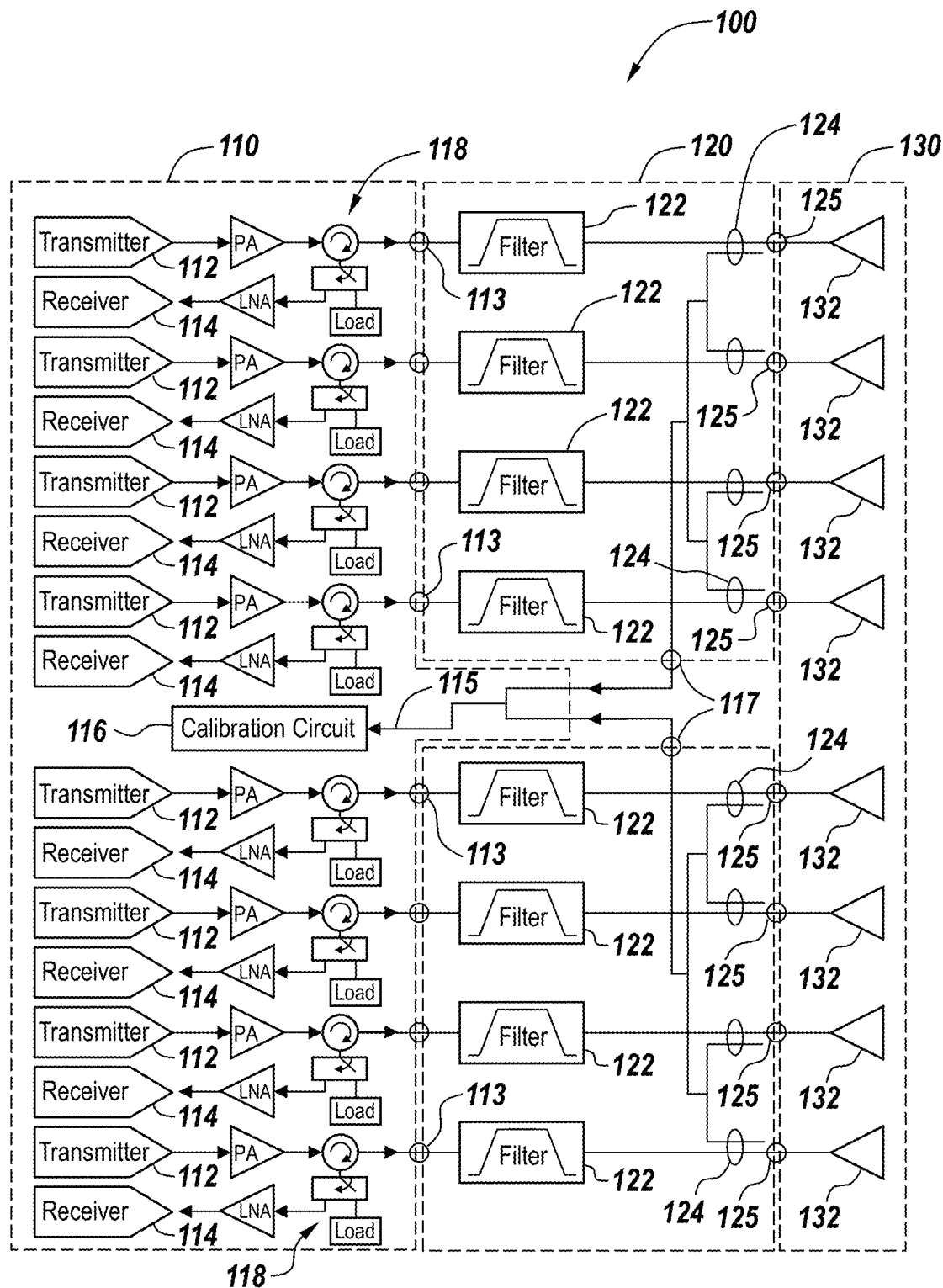
FIG. 2A is an electrical schematic of an active antenna system (AAS) according to an embodiment of the invention.

Referring now to FIGS. 2A-2B, an active antenna system (AAS) according to an embodiment of the invention is illustrated as including an eight channel transmit/receive (8T8R) radio unit 100. This radio unit 100 includes: (i) an 8T8R radio 110, (ii) a pair of highly integrated 4T4R filter/coupler units 120 within respective housings 121, and (iii) an antenna 130, which has a plurality of radiating elements 132 for transmitting (Tx) and receiving (Rx) radio frequency (RF) signals. In some embodiments, the antenna 130 may be configured to include four (4) columns of cross-polarized dipole radiating elements 132, with each column processing two of the 8T8R radio signals at different +45° and −45° polarizations, for example. In other embodiments that use a 16T16R radio, the antenna 130 may be configured to include eight (8) columns of cross-polarized dipole radiating elements 132, with each column processing two of the 16T16R radio signals at different +45° and −45° polarizations. In still other embodiments that use a 32T32R radio, the antenna 130 may be configured to include eight (8) columns of cross-polarized dipole radiating elements 132, with each half-column processing two of the 32T32R radio signals at different +45° and −45° polarizations. And, in further embodiments that use a 64T64R radio, the antenna 130 may be configured to include eight (8) columns of cross-polarized dipole radiating elements 132, with each quarter-column processing two of the 64T64R radio signals at different +45° and −45° polarizations.

As shown by FIG. 2A, the 8T8R radio 110 includes eight transmitters 112, which generate corresponding RF signals from received baseband data, eight RF receivers 114, which process RF signals received by the antenna 130, and a calibration circuit 116. As will be understood by those skilled in the art, a bidirectional signal routing circuit 118 may be provided for each transmitter 112 and receiver 114 pair. As shown, the routing circuit 118 may include a conventional arrangement of a power amplifier (PA), which supports RF signal transmission to a radio output 113, and a low noise amplifier (LNA), which amplifies received RF signals prior to demodulation.

The output of each power amplifier is coupled to a first port of a three port circulator 118. The second port of each circulator 118 is coupled to a respective one of the radio outputs 113. The third port of each circulator 118 is coupled to an input of a respective transmit/receive switch 119. The first output of each transmit/receive switch 119 is coupled to a respective one of the low noise amplifiers (LNA), while the second output is coupled to a terminating load such as a resistor. When the radio 110 is operating in a transmit mode, RF signals output by one of the power amplifiers are passed to its associated circulator 118, and output the circulator at the second port where they are passed to radio port 113. When the radio 110 is operating in a receive mode, received RF signals are passed from the antenna elements 132 to radio port 113, where they are passed to circulator 118. These received RF signals are output at the third port of the circulator 118 to the RF switch 119, and the RF switch 119 is set to pass these signals to the low noise amplifier. When the radio 110 is operating in a transmit mode, the RF switch 119 may be set to connect the input port thereof to the terminating load so that any residual amount of the RF energy of the RF transmit signal is passed to the load in order to protect the low noise amplifier from possible damage.

Advantageously, each of the 4T4R filter/coupler units 120 is illustrated as including a highly integrated quad-arrangement of band-pass filters 122 having antenna-side terminals/outputs 125, which are directly coupled to respective calibration couplers 124. As explained more fully hereinbelow, the output terminals of the calibration couplers 124 can be electrically coupled together and to a respective feedback port 117 associated with each filter/coupler unit 120. Based on this configuration, calibration feedback signals generated by the calibration couplers 124 may be provided through a single port 117 to a strip line 115 associated with the calibration circuit 116, in order to support transmitter (Tx) calibration. The calibration circuit 116 may also be configured to inject a respective RF signal through each of calibration couplers 124 in order to support receiver (Rx) calibration. In further embodiments, a combiner/switch matrix (not shown) may also be utilized to transfer the calibration feedback signals.

As is further shown in FIG. 2A, the calibration circuit 116 is split into two circuits, and these circuits are implemented together with the band-pass filters 122. As a result, separate cabling connections are not required between the filter units and the calibration board, as was the case in the prior art approach shown in FIG. 1B. Two 4T4R filter/coupler units 120 are provided as this may allow each unit to be located close to its associated radiating elements, allowing the use of lower loss connections between each 4T4R filter/coupler units 120 and its associated radiating elements. Because two 4T4R filter/coupler units 120 are provided, then two connections are also required between the 4T4R filter/coupler units 120 and the calibration circuit 116 in radio 110, as compared to a single connection in the prior art approach of FIG. 1B. This extra connection, however, is more than made up for by the smaller number of connections required in other parts of the circuit. The calibration circuit 116 may be any conventional calibration circuit that is used to detect phase and/or amplitude variations along each of the paths from the 8T8R radio to the radiating elements and to then digitally compensate for these variations.

As shown by FIG. 2B, one embodiment of a radio 110 and filter/coupler unit 120 that can be utilized within an active antenna system (AAS) 100 includes a chassis 144 (with heat sink fins 146). In some embodiments, the radio 110 may be configured so that the circuit components illustrated by FIG. 2A are embodied on a printed circuit board (PCB) 140 within a PCB enclosure 142. This PCB enclosure 142 may be configured with openings therein that support the inclusion of radio output ports 113 and feedback ports 117, which are electrically coupled to a plurality of filter/coupler units 120 enclosed within respective housings 121. While only one filter/coupler unit 120 is shown in FIG. 2B, FIG. 2A shows that four such filter/coupler units 120 may be mounted on chassis 144 in an example embodiment. Each of these filter/coupler units 120 may include a plurality of cavity-type band-pass filters 122. Each filter 122 has an input electrically coupled to a respective one of the radio output ports 113 and an output that is electrically coupled to a respective one of the antenna-side output terminals 125 (e.g., blind mate connectors).

Additionally, each filter/coupler unit 120 includes a calibration coupler 124 integrated therein that diverts (i.e., "taps" off) a small amount of the transmitted RF energy to the printed circuit board 140. Calibration circuitry in the form of combiners on the printed circuit board 140 combine the RF energy output from the calibration couplers 124 included in each filter/coupler unit 120 in order to generate a composite calibration signal that is passed to feedback port 117, from which it is provided to calibration circuit 116. Additionally, the calibration circuitry may be further configured so that each calibration coupler 124 injects RF energy into received RF signals to thereby support receiver (Rx) calibration.

Figure 3:
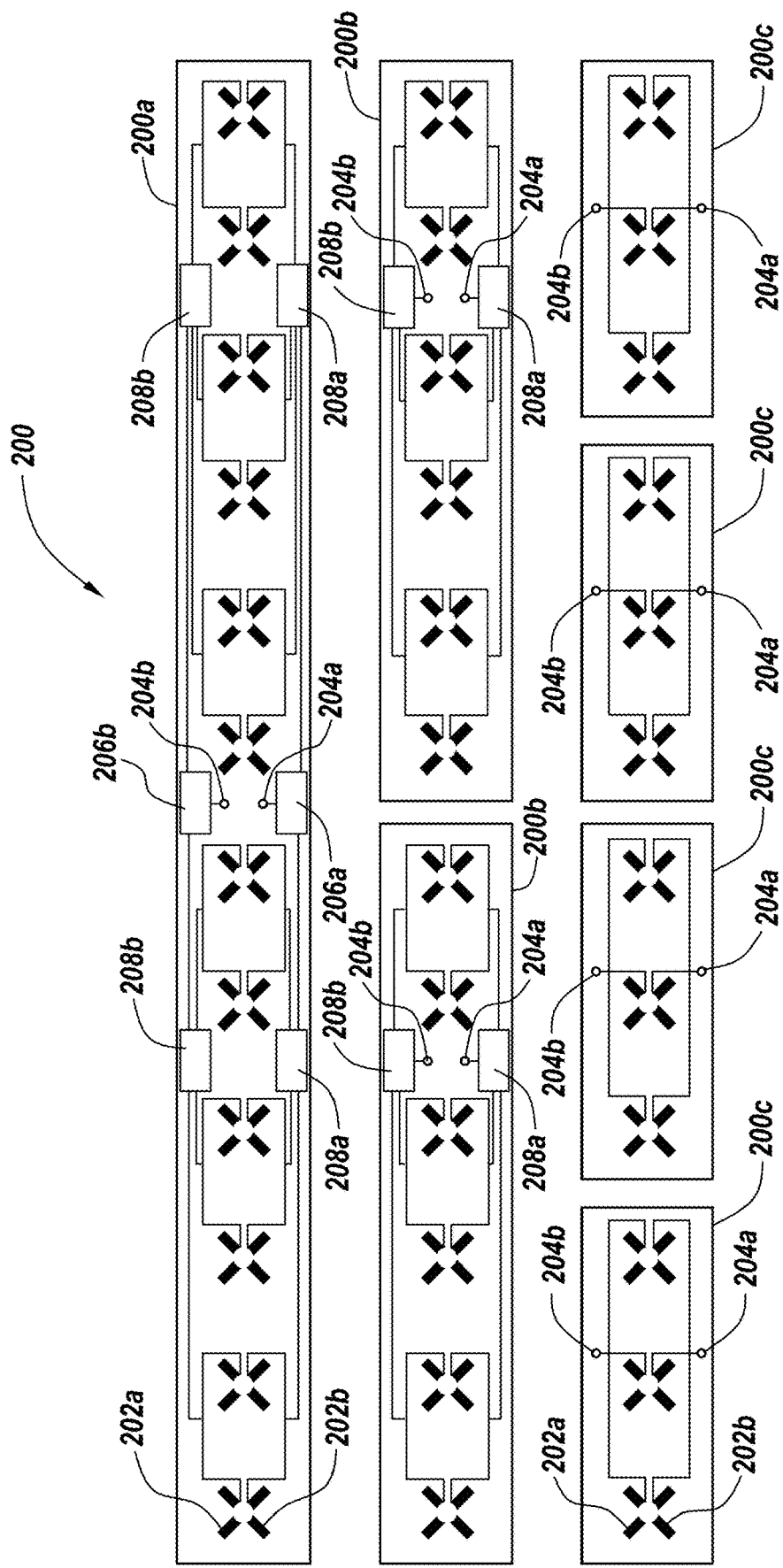
FIG. 3 is a plan view of feed boards that may be used in the AAS of FIG. 2A, according to embodiments of the invention.

Referring now to FIG. 3, an antenna 130 according to additional embodiments may utilize printed circuit feed boards 200, which are mounted on a front-side of an antenna reflector (see, e.g., FIG. 4), to route RF feed signals (with desired phases) to radiating elements supported thereon. As shown, a feed board 200*a* may be utilized in combination with twelve (12) radiating elements 132, which are configured as slant −45°/+45° cross-polarized dipole radiators 202*a*, 202*b* and supported on the feed board 200*a* by respective feed stalks (not shown). This feed board 200*a* also includes a cascaded phase shifter network to provide, in effect, a pair of 1-to-6 phase shifters that collectively support 16T16R (or 8T8R) antenna operation when eight side-by-side feed boards 200*a* are used to define eight, 12-row, columns of the antenna 130.

This cascaded phase shifter network is illustrated as including a 1-to-2 phase shifter 206*a* having an input terminal responsive to −45° feed signals provided to a first input port 204*a* of the feed board 200*a* and a pair of output terminals that are electrically coupled to respective input terminals of a corresponding pair of 1-to-3 phase shifters 208*a*. As shown, the six output terminals of this first pair of 1-to-3 phase shifters 208*a* are electrically coupled to corresponding pairs of slant radiators 202*a* that collectively support −45° radiation patterns across the eight columns. Similarly, the phase shifter network is also illustrated as including a 1-to-2 phase shifter 206*b* having an input terminal responsive to +45° feed signals provided to a second input port 204*b* of the feed board 200*a* and a pair of output terminals that are electrically coupled to respective input terminals of a corresponding pair of 1-to-3 phase shifters 208*b*. And, the six output terminals of this second pair of 1-to-3 phase shifters 208*b* are electrically coupled to corresponding pairs of slant radiators 202*b* that collectively support +45° radiation patterns across the eight columns.

According to another embodiment, a pair of half-length feed boards 200*b* may be utilized in combination with the twelve pairs of dipole radiators 202*a*, 202*b* and two pairs of 1-to-3 phase shifters 208*a*, 208*b*, to collectively support a 32T32R antenna implementation when eight side-by-side pairs of feed boards 200*b* are used to define eight columns of the antenna 130. In this implementation, each of the pair of feed boards 200*b* is responsive to a corresponding pair of feed signals received at the input ports 204*a*, 204*b*. FIG. 3 also illustrates a 64T64R antenna implementation whereby four, quarter-length, feed boards 200*c* are used in each of eight columns, with three pairs of cross-polarized dipole radiators 202*a*, 202*b* per board 200*c*. As shown, each of these quarter-length feed boards 200*c* is responsive to a unique pair of feed signals provided to each input port pair 204*a*, 204*b*. No phase shifters are provided on the feed boards 200*c*.

Figure 4:
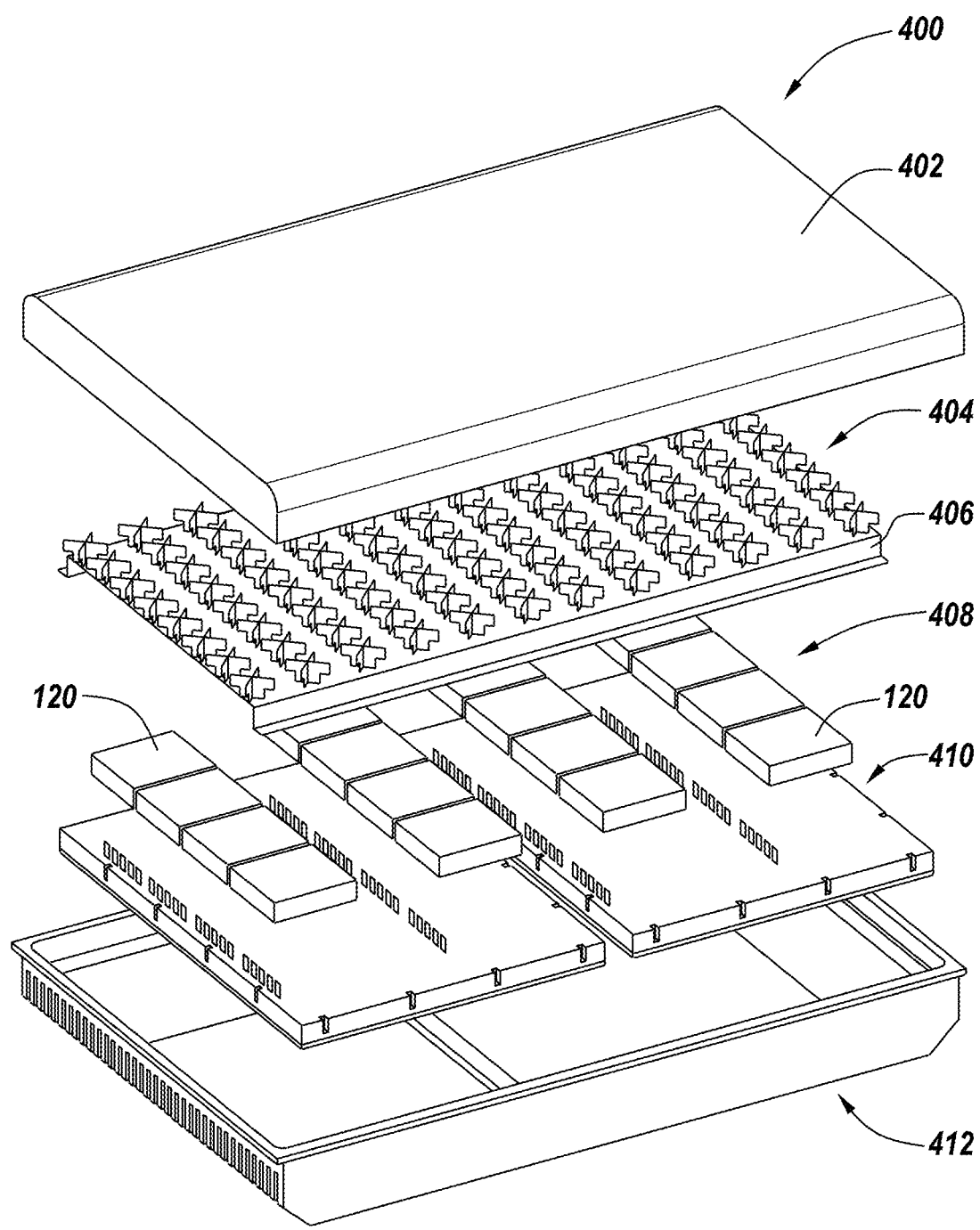
FIG. 4 is an exploded view of an active antenna system (AAS) according to an embodiment of the invention.

Referring now to FIG. 4, the 64T64R antenna implementation utilizing eight columns of quarter-length feed boards 200*c* (i.e., 32 feed boards 200*c* containing 3 radiating elements 132 per board) may be provided within a 64T64R active antenna system (AAS) 400, which can operate in a relatively high frequency band (e.g., 3.3 GHz-3.8 GHz) as a beamforming antenna, for example. This AAS 400 is illustrated as including a 64T64R radio 410 (i.e., active circuit), which is mounted on an underlying heat sink 412. According to some embodiments, the 64T64R radio 410 may include similar components to the radio 110 of FIG. 2A, but with a total of 64 pairs of transmitters/receivers (112, 114) included. In addition, a 4×4 filter/coupler array 408, which may include 16 (i.e., 64/4) independently housed filter/coupler units 120, is provided between the radio 410 and a rear-facing surface of a reflector 406. This reflector 406, which can include an 8 column×12 row array 404 of radiating elements 132 and an 8×4 array of feed boards 200*c* thereon, is enclosed by a radome and protective (e.g., waterproof) cover 402. This AAS may operate as a fully functional and independent antenna, which can be fully calibrated and factory tested to guarantee rated performance.

Moreover, as shown by FIG. 5, this AAS 400 may be utilized in combination with a larger "passive" base station antenna 440 to thereby yield a highly integrated multi-antenna base station 500 that supports RF communication over multiple frequency bands, but does not typically require a widening of the passive base station antenna 440 to accommodate the AAS 400. In particular, the AAS 400, or an alternative AAS, such as a 32T32R AAS 400', 16T16R AAS (not shown) or a 8T8R AAS 400", may be configured to support: (i) efficient and reliable attachment and integration into a rear-side recess/opening 430 in the base station antenna 440; (ii) general compatibility with the radiator layout requirements of a lower band antenna (e.g., passive antenna containing larger radiating elements); and (iii) modularized in-the-field removal/repair (or replacement/upgrade) capability without passive antenna interference.

Although not shown in FIG. 5, the radome and protective cover 402 of FIG. 4 may be used in combination with a rear-facing protective AAS cover 414, to provide a watertight and solar protective enclosure surrounding the AAS 400, upon insertion into and attachment to the base station antenna 440.

Advantageously, the degree of integration between the radiating elements 132 within an "active" AAS described herein (e.g., 64T64R, 32T32R, 16T16R, 8T8R) and the radiating elements within the larger "passive" base station antenna 440 may be increased by configuring the AAS and base station antenna 440 so that, upon attachment, the feed boards and radiating elements associated with these devices are closely aligned to each other. For example, as illustrated by FIGS. 6A-6B, the 64T64R AAS 400 and base station antenna 440 of FIG. 5 may be configured so that, upon attachment, the quarter-length feed boards 200*c* and the array 404 of radiating elements 132 thereon, which are mounted on the front surface of the reflector 406 of FIG. 4, are closely received and "nested" within a rear-side opening in the base station antenna 440.

Figure 6A:
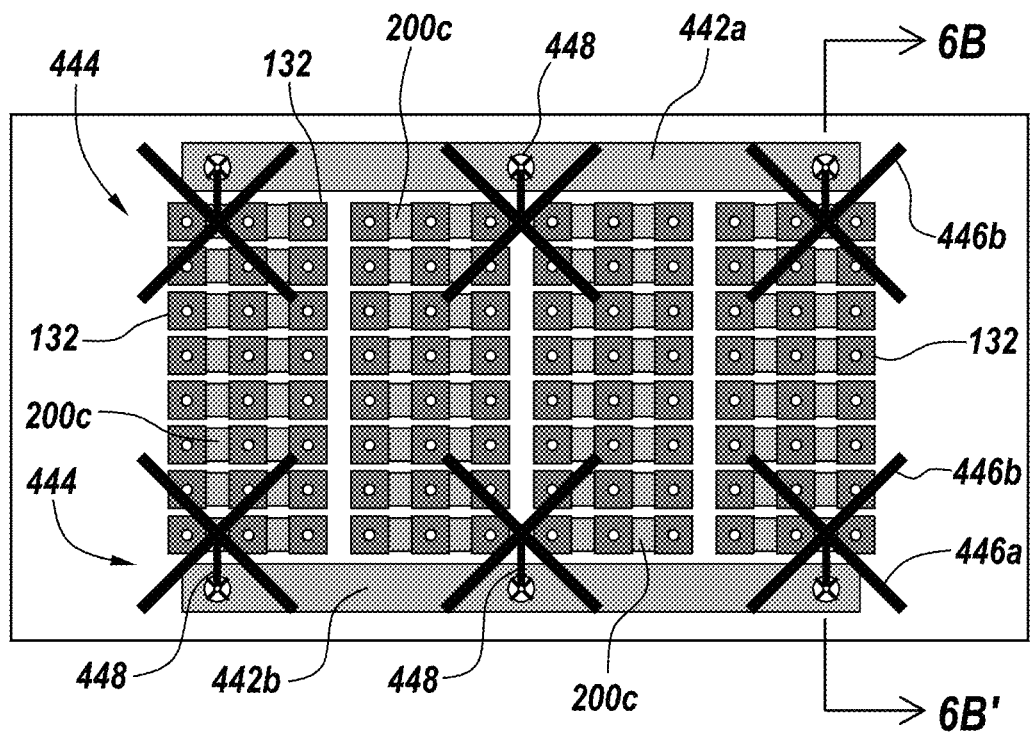
FIG. 6A is a plan view of a feed board and radiating element layout, which may be used in the AAS of FIGS. 4-5, according to an embodiment of the invention.
Figure 6B:
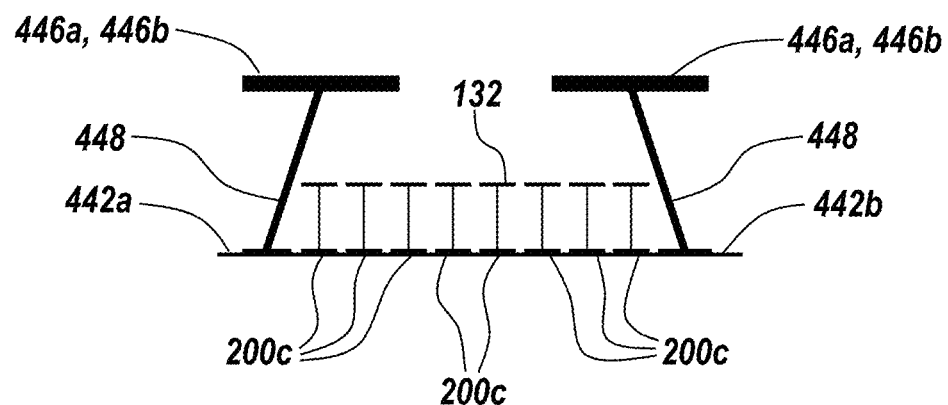
FIG. 6B is a side view of the feed board and radiating element layout of FIG. 6A, taken along lines 6B-6B'.

In particular, FIGS. 6A-6B illustrate 8 columns of radiating elements 132 within the AAS 400; and each of these columns includes 12 radiating elements 132, which are arranged into groups of 3 radiating elements 132 per quarter length feed board 200*c*. First and second feed boards 442*a*, 442*b* of the passive base station antenna 440 are also provided, which extend closely adjacent (and are preferably planar with) the feed boards 200*c* associated with the first and eighth columns of radiating elements 132 within the AAS 400. The first and second feed boards 442*a*, 442*b* are each illustrated as including three (3) cross-dipole radiating elements 444, which are configured to operate in a frequency band that is lower than the frequency band associated with the AAS 400, such as, for example, all or part of the 617-960 MHz frequency band. As shown, the radiating elements 444 may include slant −45°/+45° dipole radiators 446*a*, 446*b* and slanted/tilted feed stalks 448, which extend at acute angles relative to the front-facing surfaces of the feed boards 200*c* (and underlying reflector 406). The use of slanted feed stalks 448 allows for higher integration by supporting the radiators 446a, 446b at least partially over the first three and last three columns of the radiating elements 132 within the AAS 400.

In this manner, the illustrated integration of the "lower frequency" radiators 446a, 446b as extending over the "higher frequency" radiating elements 132 somewhat mimics the configuration of a single reflector having relatively small and large radiating elements highly integrated thereon (and with a relatively compact radiator footprint), and facilitates the manufacture of a multi-antenna base station 500 having a relatively narrow width that is comparable to an otherwise equivalent base station having non-detactable arrays of relatively high band radiating elements therein.

Figure 6C:
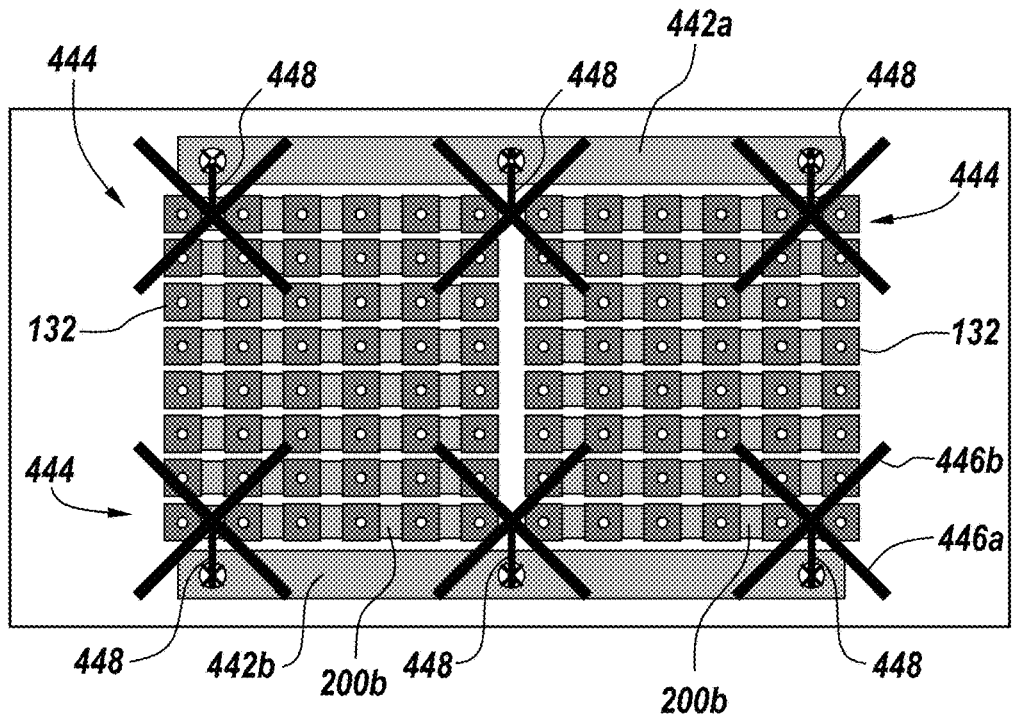
FIG. 6C is a plan view of a feed board and radiating element layout, which may be used in the AAS of FIGS. 4-5, according to an embodiment of the invention.
Figure 6D:
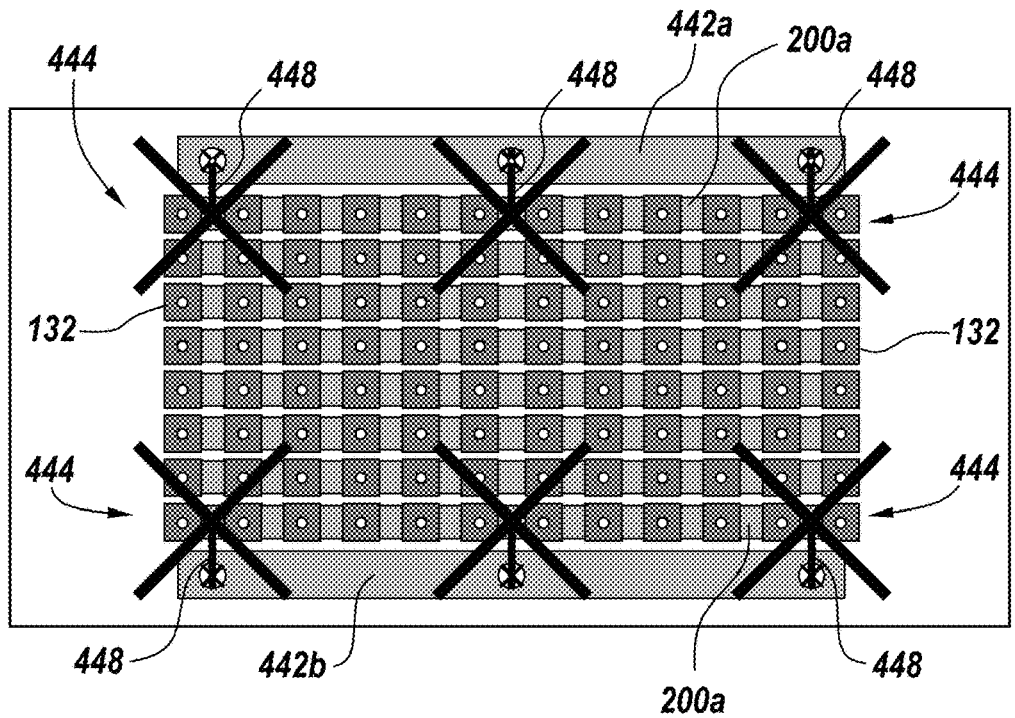
FIG. 6D is a plan view of a feed board and radiating element layout, which may be used in the AAS of FIGS. 4-5, according to an embodiment of the invention.
Figure 6E:
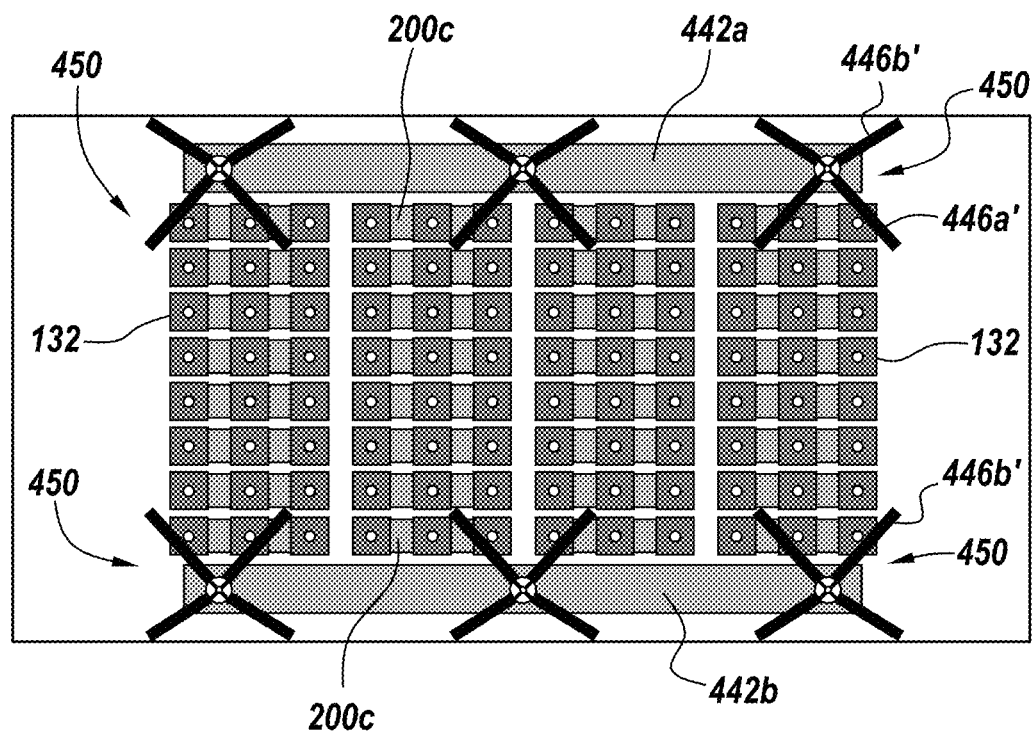
FIG. 6E is a plan view of a feed board and radiating element layout, which may be used in the AAS of FIGS. 4-5, according to an embodiment of the invention.

Nonetheless, as illustrated by FIG. 6E, the use of slated feed stalks 448 may not be necessary when asymmetric dipole radiators, such as radiators 446a', 446b' having bent arms (i.e., non-linear longitudinal axes), are utilized as radiating elements 450 on the first and second feed boards 442a, 442b to thereby achieve a high level of radiator integration. And, in some further embodiments, the radome 402 illustrated by FIG. 4 may be provided between the radiating elements 132 of the AAS 400 and the radiators 446a, 446b and slated feed stalks 448 (of the radiating elements 444) within the base station antenna 440.

The same arrangement of feed boards illustrated by FIGS. 6A-6B may also be utilized with respect to the previously described 32T32R AAS 400' and 16T16R AAS. For example, as illustrated by FIG. 6C, each of eight columns of 12 radiating elements 132 may be arranged into two groups of 6 radiating elements 132, which are provided (with phase shifters (not shown)) on two half-length feed boards 200b. The first and second feed boards 442a, 44ab and overhanging radiating elements 444 of the base station antenna 440 are also provided, which extend closely adjacent the feed boards 200b associated with the first and eighth columns of radiating elements 132 within the AAS 400', as described with respect to the embodiment of FIGS. 6A-6B. Finally, FIG. 6D illustrates an essentially identical configuration of feed boards and radiating elements, as described with respect to FIGS. 6A-6C; however, the feed boards 200a are full-length feed boards (with cascaded phase shifters (not shown)), as described above with respect to FIG. 3.

Figure 6F:
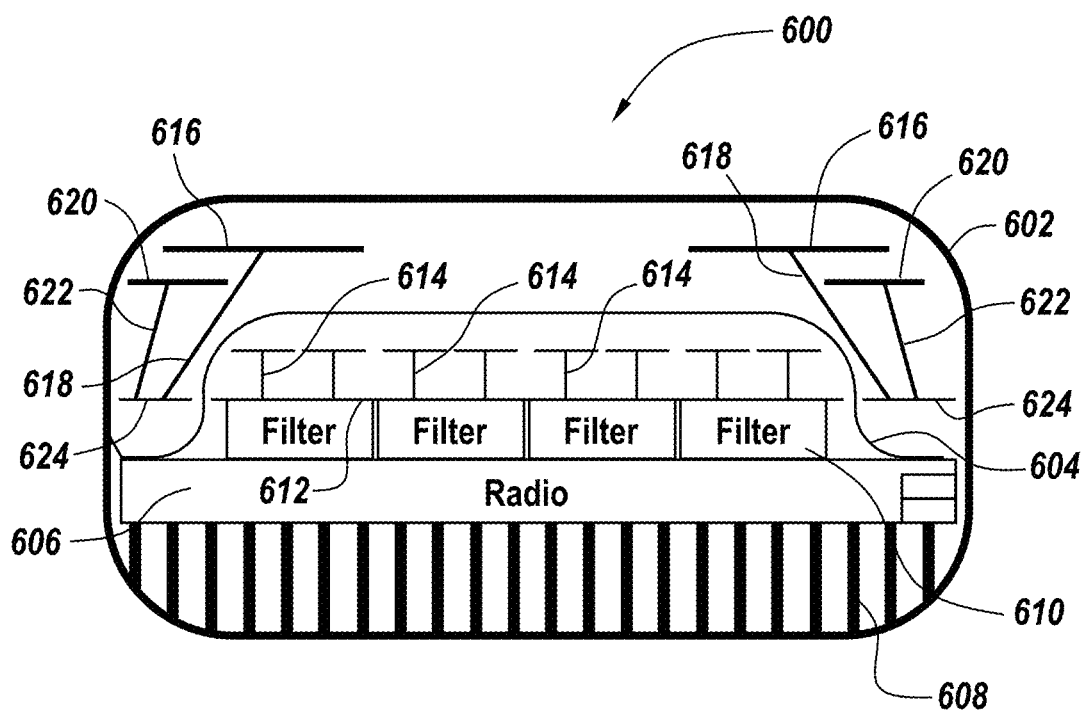
FIG. 6F is cross-sectional view of the BSA of FIG. 5, according to another embodiment of the invention.

Referring now to FIG. 6F, a base station antenna (BSA) 600 according to another embodiment of the invention is illustrated as including the components of the AAS 400 of FIG. 4 and components of an alternative embodiment of the passive base station antenna 440 of FIG. 5. In particular, FIG. 6F is a cross-sectional view of a BSA 600, which includes a two-piece radome-type enclosure 602 and an interior radome/cover 604 of a detachable and field replaceable AAS, such as the AAS 400 of FIG. 4. In some embodiments, the enclosure 602 may be configured as a watertight combination of: (i) the rear-facing protective AAS cover 414, and (ii) a radome of the passive base station antenna 440 of FIG. 5. In addition, the AAS is illustrated in more simplified form as including: a radio 606 within a chassis containing a multi-fin heatsink 608, a filter array 610 mounted adjacent a rear side of a reflector 612, and a multi-column array of radiators 614 thereon. And, as described hereinabove with respect to FIGS. 6A-6B, relatively low band radiating elements 616 with slanted feed stalks 618 may also be provided on respective feed boards (not shown), which are mounted to an underlying reflector 624 (that may be coplanar with the AAS reflector 612). As further shown by FIG. 6F, relatively mid-band radiating elements 620 with slanted feed stalks 622 may be provided in close proximity to the larger radiating elements 616 and slanted feed stalks 618. Thus, with respect to FIG. 6A, the feed boards 442a, 442b may be utilized to include relatively mid and low band radiating elements thereon.

According to another embodiment, the full-length and half-length feed boards 200a, 200b and on-board phase shifters 206a, 206b, 208a, 208b of FIG. 3 need not always be required, in combination, to implement the above-described 32T32R and 16T16R embodiments of a AAS 400. For example, as shown by the quarter-length feed board layouts of FIGS. 7A-7C, the same feed board 200c (i.e., same antenna design) may be used to implement each of the 64T64R, 32T32R and 16T16R radio unit embodiments, by moving the phase shifters (PS) to the radio-side of the reflector 406 shown in FIG. 4 and using blind mate connectors (not shown) to connect the phase shifters PS to the feed boards 200c.

Figure 7A:
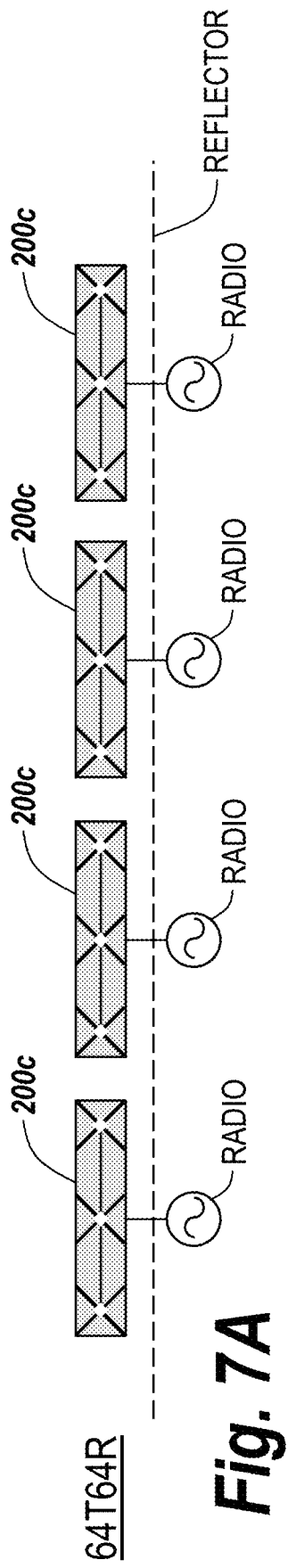
FIGS. 7A-7C illustrate plan layout views of equivalent feed boards that may be utilized to support different configurations of an active antenna system (AAS) within a base station antenna (BSA), according to an embodiment of the invention.
Figure 7B:
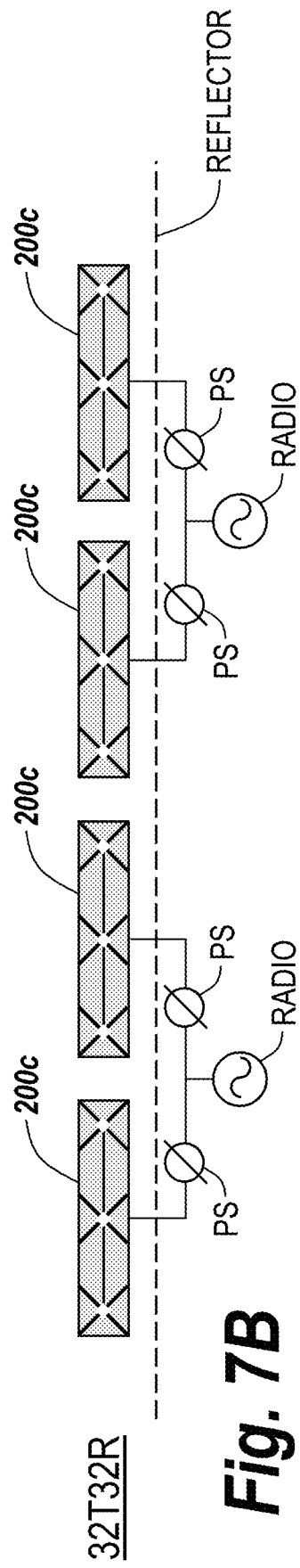
Figure 7C:
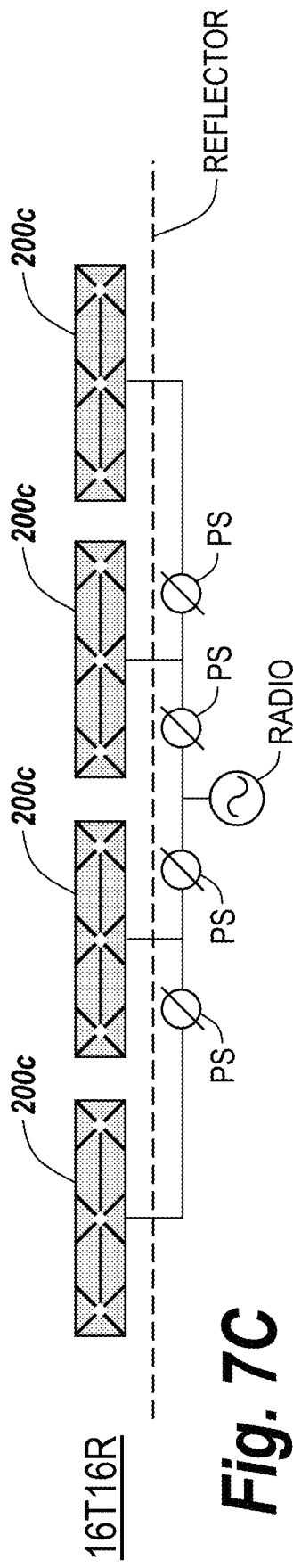

For example, referring to FIG. 2A and FIG. 7C, for the 16T/16R embodiment, an input of a phase shifter may be connected to each node 125. Each phase shifter may have four outputs that are coupled to the four feed boards 200c that form each of the eight columns of radiating elements 132. Referring to FIG. 2A and FIG. 7B, for the 32T/32R embodiment, an input of a phase shifter may be connected to each node 125. Each phase shifter may have two outputs that are coupled to the two feed boards 200c that form each of the eight upper columns of radiating elements 132 and each of the eight lower columns of radiating elements 132. As shown in FIG. 7A, in the 64T64R embodiment, the phase shifters may be omitted. Thus, in some embodiments, the phase shifters PS may be moved (and mounted) to a location extending between the 4×4 filter/coupler array 408 and a rear-side of the reflector 406 of FIG. 4.

Figure 8A:
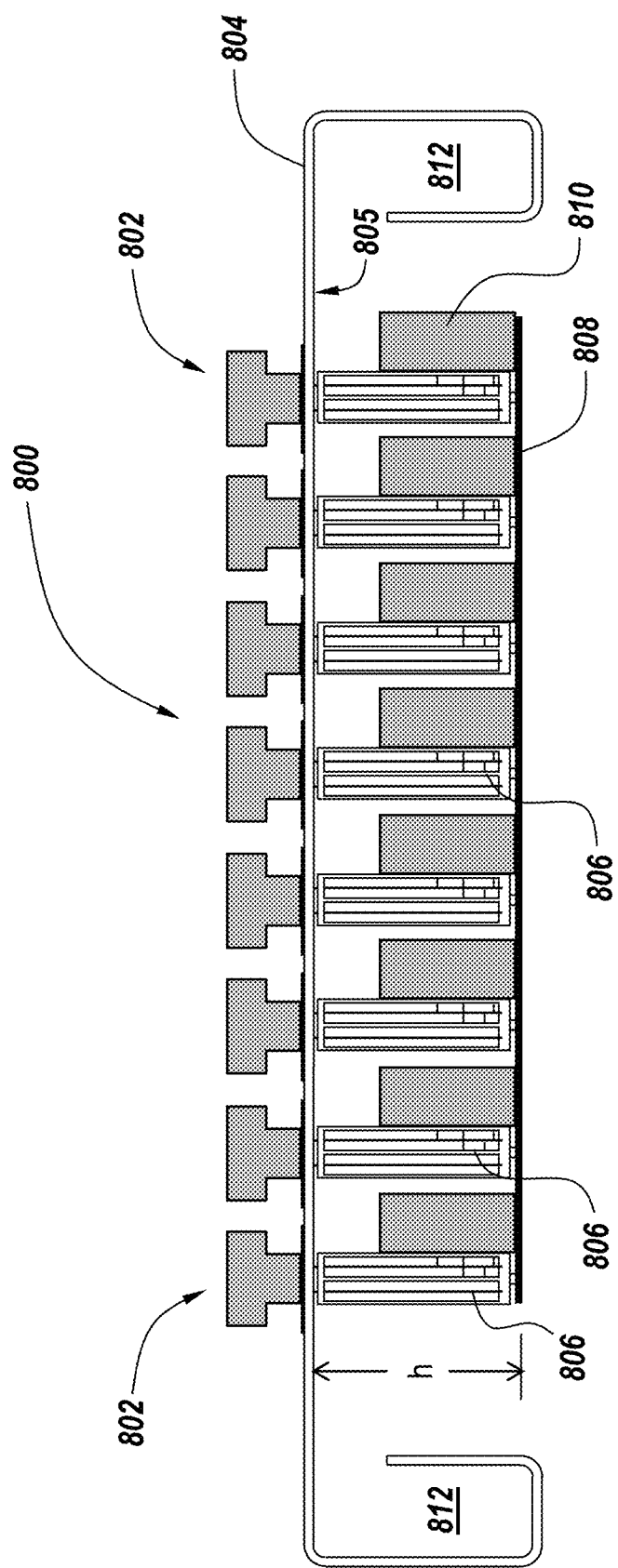

FIGS. 8A-8B illustrate a base station antenna 800 according to another embodiment of the invention. In this embodiment a plurality of array-long dual-channel (e.g., −45°, +45°) phase shifters 806 are provided on a rear side 805 of a reflector 804 (with underside RF chokes 812) to improve performance by at least partially eliminating the use of conventional phase cable interconnects. Nonetheless, relatively small aperture board-to-board (B-B) interconnects (not shown) may be provided, which extend through the reflector 804 to distribute feed signals to front-side feed boards, feed stalks and cross-dipole radiators, which are collectively identified by reference numeral 802. A filter bank 810 and calibration board 808 are also provided adjacent a rear end of the phase shifters 806. As illustrated by FIG. 8B, both the filter bank 810 and calibration board 808 are considerably shorter in length (as measured in a column length direction) relative to the phase shifters 806. And, a spacing "h", as measured between the calibration board 808 and a rear side 805 of the reflector 804, may vary as a function of how the phase shifters 806 are implemented (e.g., stripline, etc.).

Figure 9A:
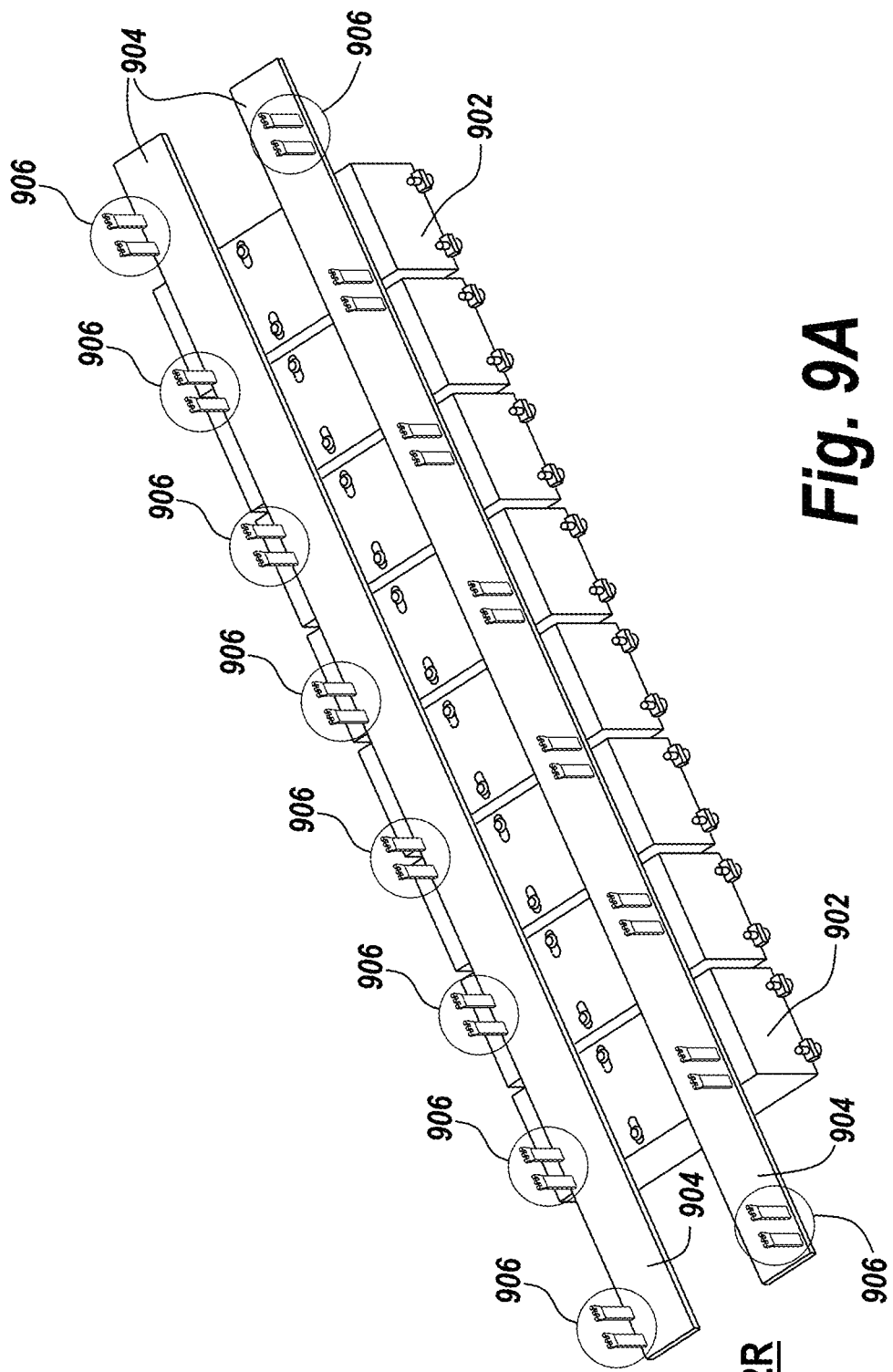
FIGS. 9A-9B are a side perspective view and plan view of a bank of filters and calibration boards, according to an embodiment of the invention.
Figure 9B:
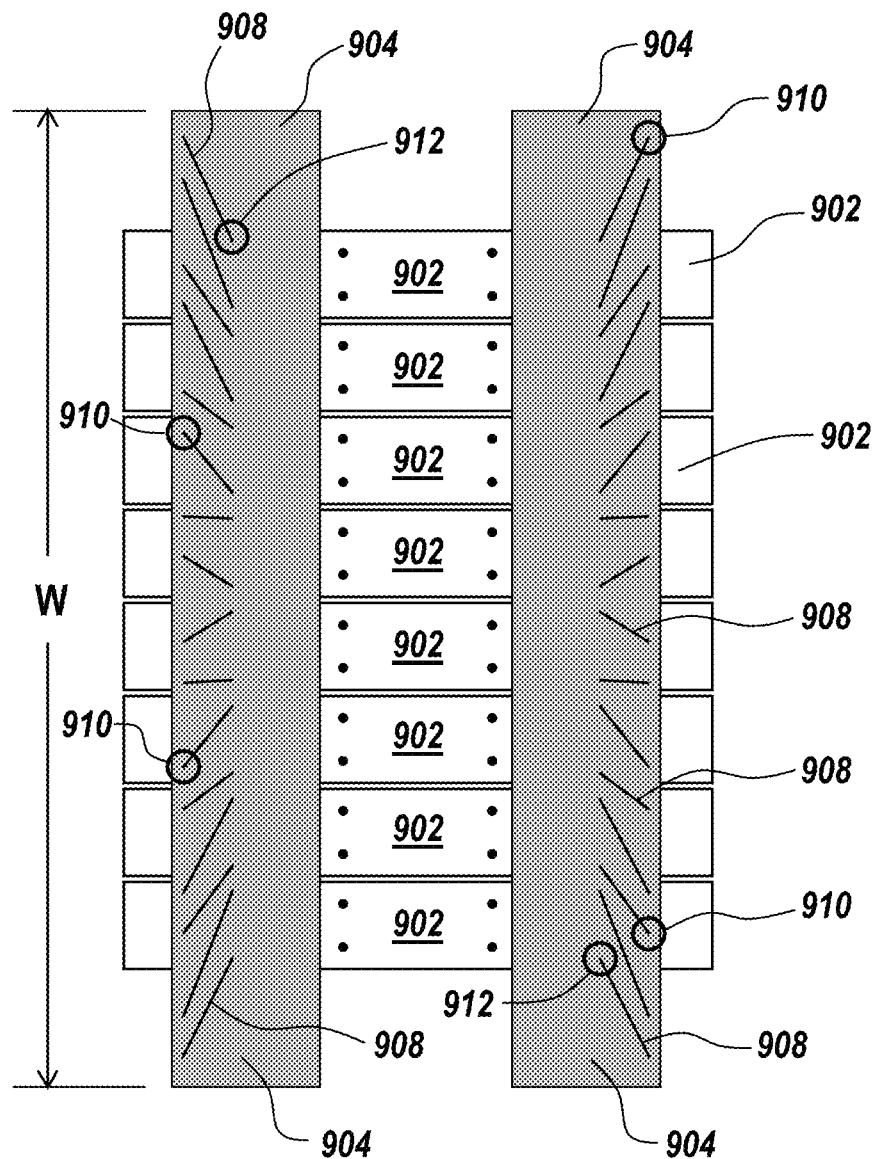

According to another embodiment of the invention illustrated by FIGS. 9A-9B, an 8-wide bank of filters 902, which may be compatible with an 8-column antenna, such as the 8-column antenna illustrated in the 32T32R AAS 400' of FIG. 5, may be integrated with a pair of calibration boards 904 that support, among other things, efficient routing of signals between each of the filters 902 and corresponding columns within the 8-column antenna. The calibration circuitry on these boards 904 includes couplers and combiners (not shown) and functions as an electrical bridge to connect the filters 902 to the antenna, as well as adjusting the connector locations to thereby eliminate conventional cable connections.

As shown by FIG. 9A, two pairs of feed board connectors 906 are provided as board-to-board (B-B) connectors for each column of radiating elements within the 8-column antenna, with each pair being connected to a corresponding pair of input ports (e.g., 204a, 204b in FIG. 3) associated with a respective feed board (e.g., 200b in FIG. 3). And, as shown by FIG. 9B, which is a plan view of the filter bank 902 and calibration boards 904 of FIG. 9A, respective pairs of metal "widening" traces 908 are provided to route signals from corresponding filter output terminals 912 to corresponding calibration board output terminals 910 at the base of each of the feed board connectors 906, which span the full width "W" of a corresponding calibration board 904.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A base station antenna, comprising:
    a first antenna comprising first and second spaced-apart columns of first radiating elements, which are configured to operate within a first frequency band; and
    a detachable/reattachable active antenna system (AAS) configured to operate within a second frequency band, said AAS comprising a second antenna extending adjacent the first and second columns of first radiating elements, said second antenna comprising: (i) an AAS reflector having a two-dimensional array of second radiating elements on a forward-facing surface thereof, (ii) a bank of filters, and (iii) at least one calibration board extending between the bank of filters and a rear-facing surface of the AAS reflector, said at least one calibration board having calibration circuitry thereon; and
    wherein a plurality of the first radiating elements include respective feed stalks that are tilted such that the plurality of first radiating elements extend over corresponding portions of the AAS reflector.

2. The base station antenna of claim 1, wherein at least some of the first radiating elements of the first column of radiating elements are supported on a first feed board, and at least some of the first radiating elements of the second column of radiating elements are supported on a second feed board; wherein the second antenna comprises at least one feed board upon which the two-dimensional array of second radiating elements is supported; and wherein the calibration circuitry functions as an electrical bridge to connect the bank of filters to the at least one feed board.

3. The base station antenna of claim 2, wherein each of the first radiating elements in the first column comprises a tilted feed stalk which overhangs at least a portion of the at least one feed board.

4. The base station antenna of claim 2, wherein at least one of the first and second feed boards is mounted on a reflector that is coplanar with the AAS reflector.

5. The base station antenna of claim 4, wherein the second antenna is at least partially nested within a rear facing opening in the first antenna that extends between the first and second feed boards.

6. The base station antenna of claim 2, wherein the second antenna is at least partially nested within a rear facing opening in the first antenna that extends between the first and second feed boards.

7. The base station antenna of claim 1, wherein at least one of the first radiating elements comprises a pair of cross-dipole radiating arms; and wherein each of the pair of cross-dipole radiating arms is a bent arm having a non-linear longitudinal axis.

8. The base station antenna of claim 1, wherein the second frequency band is higher than the first frequency band; and wherein the AAS reflector is aligned to an opening in a reflector having the first radiating elements thereon.

9. The base station antenna of claim 1, wherein said AAS further comprises an interior radome that is received within a rear facing opening in the first antenna.

10. The base station antenna of claim 9, wherein the first antenna comprises a reflector that is coplanar with the AAS reflector.

11. The base station antenna of claim 1, wherein said AAS is selected from a group consisting of 64T64R, 32T32R and 8T8R antennas with built-in radio.

12. The base station antenna of claim 11, wherein the base station antenna is configured to support removal and replacement of one AAS from the group with another AAS from the group without modification of the first antenna.

13. A base station antenna, comprising:
    an exterior radome;
    a first antenna extending within the exterior radome and comprising first and second spaced-apart columns of first radiating elements, which are configured to operate within a first frequency band;
    a detachable/reattachable active antenna system (AAS) configured to operate within a second frequency band, said AAS comprising a second antenna extending adjacent the first and second columns of first radiating elements, said second antenna comprising: (i) an AAS reflector having a two-dimensional array of second radiating elements on a forward-facing surface thereof, (ii) a plurality of filters, and (iii) at least one calibration board having calibration circuitry thereon; and
    an interior radome extending between forward facing surfaces of the second radiating elements and rear facing surfaces of the first radiating elements; and
    wherein at least a portion of said AAS extends through an opening in the exterior radome.

14. The base station antenna of claim 13, wherein said AAS further comprises:
    a radio having a plurality of outputs electrically coupled to a corresponding plurality of input terminals of said plurality of filters.

15. The base station antenna of claim 13, wherein said AAS is selected from a group consisting of 64T64R, 32T32R and 8T8R antennas with built-in radio.

16. The base station antenna of claim 15, wherein the base station antenna is configured to support removal and replacement of one AAS from the group with another AAS from the group without modification of the first antenna.

17. A base station antenna, comprising:
    a first antenna comprising first and second spaced-apart columns of first radiating elements, which are configured to operate within a first frequency band;
    an exterior radome mounted on the first antenna; and
    a detachable/reattachable active antenna system (AAS) configured to operate within a second frequency band, said AAS comprising:
        a second antenna extending adjacent the first and second columns of first radiating elements, said second antenna comprising an AAS reflector having a two-dimensional array of second radiating elements on a forward-facing surface thereof; and
        an interior radome extending between the second radiating elements and the exterior radome.

18. The base station antenna of claim 17, wherein said AAS is selected from a group consisting of 64T64R, 32T32R and 8T8R antennas with built-in radio.

19. The base station antenna of claim 18, wherein the base station antenna is configured to support removal and replacement of one AAS from the group with another AAS from the group without modification of the first antenna.

* * * * *